(No Model.)

C. B. SPURR.
PLOW CARRIAGE.

No. 332,566. Patented Dec. 15, 1885.

Witnesses:

Inventor.
Cyrus B. Spurr

UNITED STATES PATENT OFFICE.

CYRUS B. SPURR, OF COLUMBIA, DAKOTA TERRITORY.

PLOW-CARRIAGE.

SPECIFICATION forming part of Letters Patent No. 332,566, dated December 15, 1885.

Application filed May 5, 1885. Serial No. 164,498. (No model.)

*To all whom it may concern:*

Be it known that I, CYRUS B. SPURR, a citizen of the United States, residing at Columbia, in the county of Brown and Territory of Dakota, have invented a new and useful Plow-Carriage, of which the following is a specification.

My invention relates to improvements in carrying and controlling a plow, and of converting a walking into a riding plow by attaching the same to my carriage; and the objects of my invention are, first, to convert any walking-plow into a riding-plow, and to carry the same upon the carriage, and thereby doing away, measurably, with the friction of the plow upon the earth and lessening the draft of the plow; the second is the carrying of the plow so as to secure an evenness of depth and width of furrow and steadiness in the working of the plow, the plow being held and controlled by the carriage and the levers thereto attached more firmly and easily than when held by hand or other mechanical appliance; and, third, the attaching of one or more plows to the same carriage. I attain these objects by the mechanism illustrated in the accompanying drawings, in which—

Figure 1:
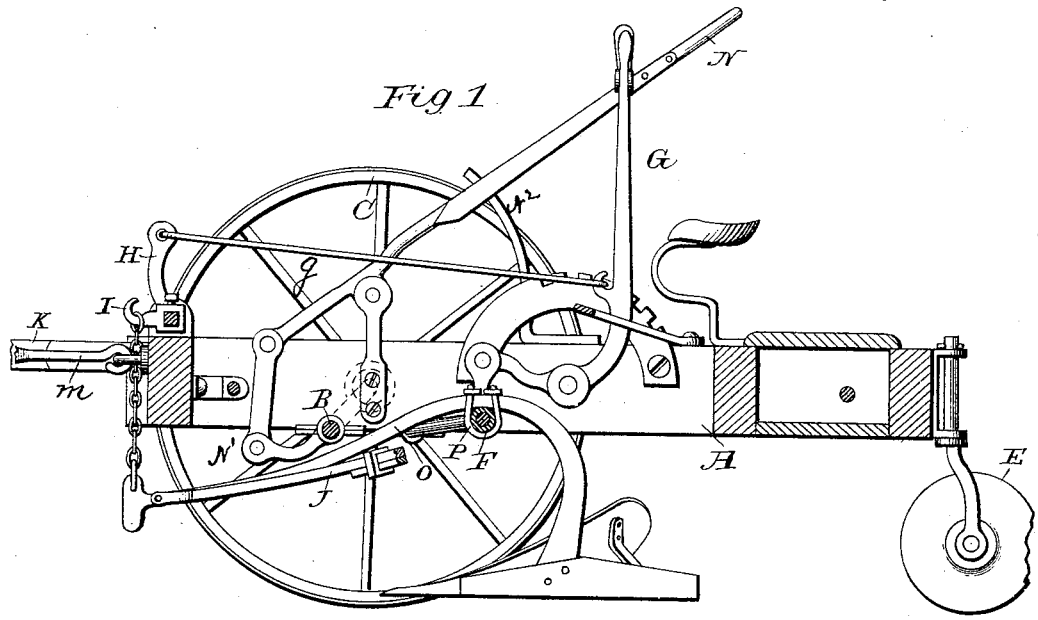
Figure 2:
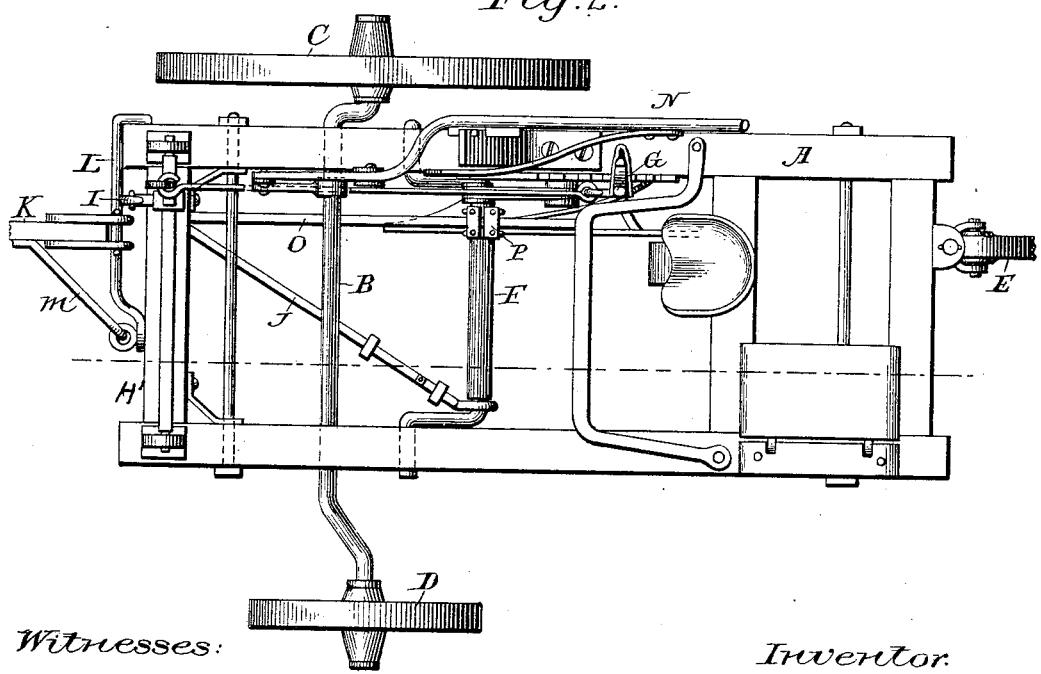

Figure 1 is a vertical section of the entire carriage. Fig. 2 represents a plan view of the plow-carriage.

The frame A is made of wood or other suitable material, and being six feet long and two feet in width for one or two plows, and with a proportional enlargement for more than two plows. The axle B is of iron, and bent at right angles on the side of the large or furrow wheel C, and bent on the opposite end sufficient to place the small or land wheel D in such a position that the said frame or carriage shall, when resting upon said axle, be exactly level, the caster-wheel E being behind, and so attached to the frame as to be moved to follow directly behind the plow in the furrow. The plow bail or axle F, upon which the plow is fastened by means of iron clips, is covered with a movable collar, thereby allowing the plow easily to adapt itself to the ground, the said bail or axle being attached to said frame by means of iron boxes upon the under side of the frame, and being raised or lowered by means of the lever G, and thereby lowering the plow into the ground or raising it. Attached to said lever G is an iron rod connecting with a lever, H, to which is attached lever I, both upon rock-shaft H', which lever I is attached to the end or beam of the plow by means of a chain or rod, so as to raise the end or point of the plow at the same time the plow is raised by the bail or axle by means of lever G. Attached to the bail or axle is a sliding brace, J, which is bolted to the end of the plow-beam and holds the plow from twisting upon the bail or axle. The plow is drawn from the end of the beam the same as in a walking-plow, the pole or tongue K being used only for turning the carriage or in backing, the pole or tongue moving from side to side on rod L, which is provided with holes and pins, and is kept in place by a sliding brace, M, the frame of the carriage and plow being leveled by the use of lever N, attached to the axle of the carriage.

O is the plow-beam attached to the bail or axle at P by iron clips.

I do not claim a patent on the frame with rear caster-wheel, or the crank-axle, or the plow-bail, or the lifting the plow-beam at front and rear, or the side brace from bail to beam of plow.

What I do claim as original invention of my own is—

1. The axle B, having the right-angled crank on the furrow-wheel side and a lesser crank and land-wheel, in combination with the lever N, crank-arm N', and rack N², whereby the frame is made level when the large wheel is in the furrow, or as when both wheels are on the land, as set forth.

2. The combination, with the frame and crank-axle, of the plow-bail E, the elbow-lever G, having the connecting-rod *g*, crank H I, rock-shaft H', brace J, and plow-beam, substantially as shown and described.

CYRUS B. SPURR.

Witnesses:
SYVER S. WOLD,
JOHN AFSETH.